Dec. 24, 1968  J. KREBS  3,417,684
TWIN LENS REFLEX CAMERA WITH BUILT-IN SPOT PHOTOMETER
Filed Oct. 8, 1965  2 Sheets-Sheet 1

INVENTOR
JACOB KREBS
BY B.P. Vishlumen. Jr.
ATTORNEY

Dec. 24, 1968  J. KREBS  3,417,684
TWIN LENS REFLEX CAMERA WITH BUILT-IN SPOT PHOTOMETER
Filed Oct. 8, 1965  2 Sheets-Sheet 2
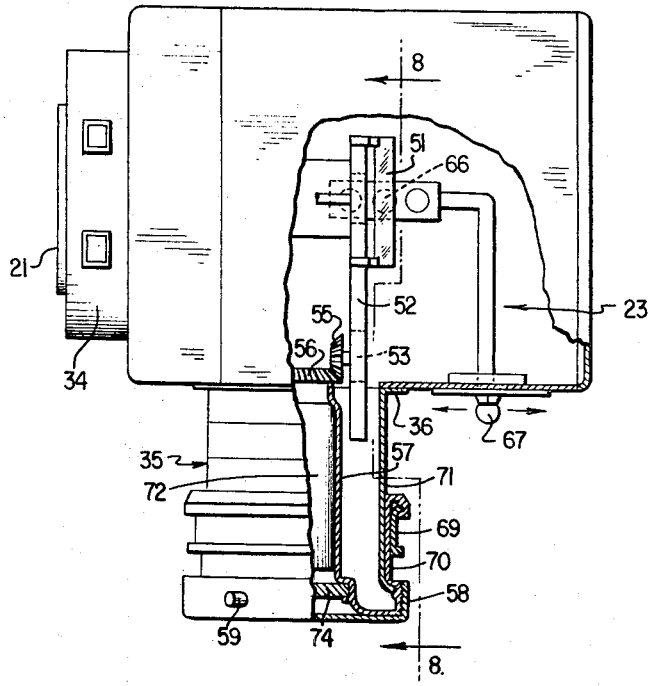
FIG. 6
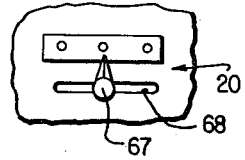
FIG. 7
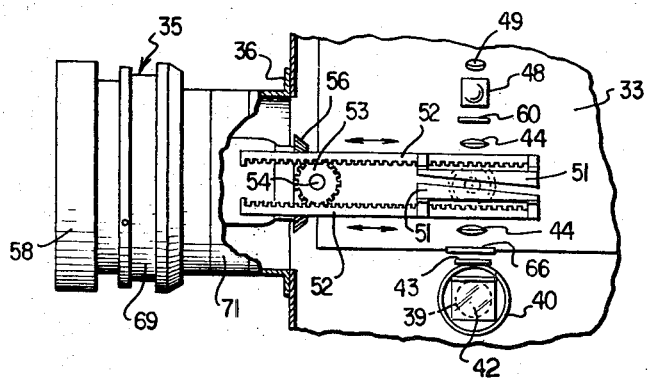
FIG. 8
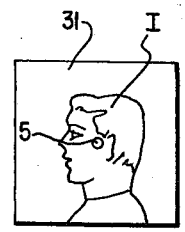
FIG. 10
FIG. 9
INVENTOR
JACOB KREBS
BY B. P. Fishburn Jr.
ATTORNEY

United States Patent Office 3,417,684
Patented Dec. 24, 1968

3,417,684
TWIN LENS REFLEX CAMERA WITH
BUILT-IN SPOT PHOTOMETER
Jacob Krebs, 2445 Fairmount Ave.,
Philadelphia, Pa. 19130
Filed Oct. 8, 1965, Ser. No. 494,014
5 Claims. (Cl. 95—10)

ABSTRACT OF THE DISCLOSURE

A twin lens reflex camera has a viewing screen at the top of the viewing chamber to allow simultaneous composing and focusing of an upright image and matching of a comparison spot of light with the hue of a small portion only of the image on said screen. A diagonal mirror in the viewing chamber has a small opening through which a small spot of light is directed onto the screen while the intensity of the light spot is being varied until the desired matching is obtained.

---

This invention relates to improvements in cameras and more particularly is concerned with a twin lens reflex camera having a built-in spot photometer.

The primary objective of the invention is to effect the physical combining of the popular twin lens reflex camera with a precision-type highly efficient photometer, and in so doing to produce a practical, compact and reasonably economical camera structure whose utility and efficiency is greatly enhanced.

Another general objective is to combine two known superior types of instruments in such a way as to greatly increase the overall convenience to the user over using the instruments separately and also to effect an overall reduction in cost due to the fact that the two chosen instruments lend themselves naturally to combining.

More particularly, according to the present invention, provision is made for viewing the comparison spot of a known type of photometer projected on the ground glass screen of the camera, ordinarily used for focusing and composing the scene to be photgraphed. The arrangement enables the same ground glass screen to serve an important dual function simultaneously and thus aids in rendering the overall instrument compact, lightweight and economical. The optical components of the spot photometer are, according to the invention, located inside of the twin lens reflex camera body, specifically in the upper chamber thereof behind the viewing lens of the camera. The lower chamber optics associated with photographing the scene are not changed or effected in any way by the invention structural modifications.

A unique advantage of the combination instrument is that the ground glass screen of the camera substitutes for the inverted circular image ordinarily seen through the telescope eyepiece of the spot photometer. The telescope eyepiece, as such, is eliminated from the instrument and the ground glass screen of the camera serves to allow simultaneous composing and focusing of the actual upright image, while the relative brightness of the comparison spot of the exposure meter is being adjusted and viewed on the ground glass screen. This arrangement renders the overall utility of the single instrument much more efficient and convenient than is the case when the two instrument are used in the usual manner.

Other objectives and advantages of the invention will become apparent during the course of the following detailed description.

In the accompanying drawings forming a part of this application and in which like numerals are employed to designate like parts throughout the same.

FIGURE 6 is a plan view of the combined camera and photometer, partly in section so as to reveal the operating parts of the photometer adjusting barrel and the optical wedge drive means associated therewith;

FIGURE 7 is a fragmentary elevational view of a pointer for controlling brightness range discs inside of the camera associated with the photometer optical system;

FIGURE 8 is a fragmentary vertical section taken on line 8—8 of FIGURE 6; and

FIGURE 9 is an enlarged fragmentary sectional view showing a Lummer-Brodhum cube utilized in the instrument, and FIGURE 10 is a view of the image or scene which is viewed on the ground glass screen including the comparison spot produced by the photometer.

Figure 4:
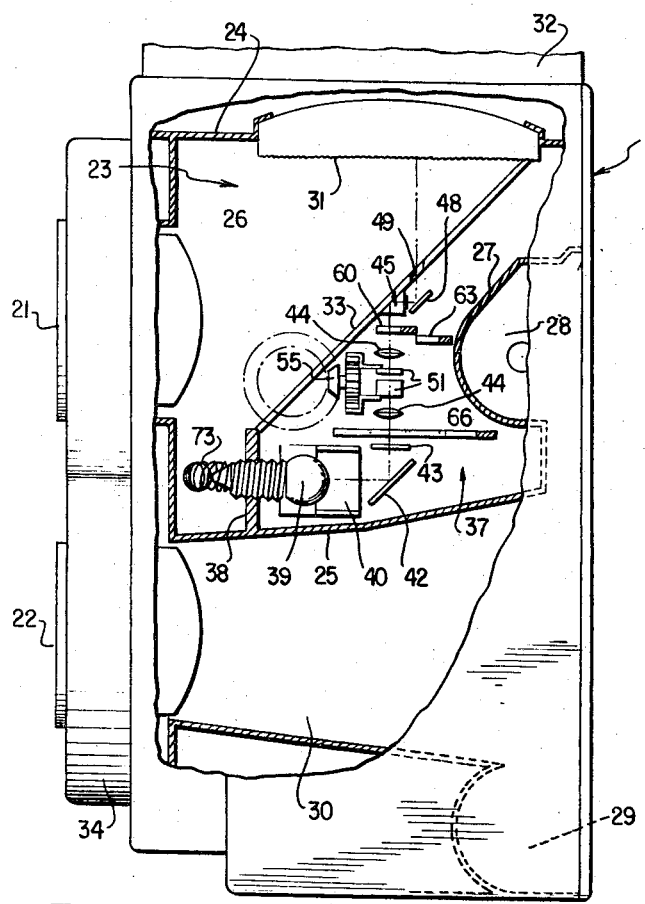
FIGURE 4 is an enlarged, partly diagrammatic, vertical sectional view through the camera illustrating the location of the photometer optical components in the upper lens chamber thereof, partly in elevation and with parts omitted.

In the drawings, wherein for the purpose of illustration are shown preferred embodiments of the invention, the numeral 20 designates the body or housing of a conventional twin lens reflex camera having an upper scene viewing lens 21 and a lower scene photographing lens 22 arranged in the usual manner. Referring to FIGURE 4, the viewing lens 21 communicates with an upper lens chamber 23 having a top wall 24, bottom wall 25, front wall 26 and side walls. The back wall of the chamber 23 is contoured as shown at 27 to form the usual upper film spool compartment 28, there being a companion lower film spool compartment 29 at the bottom of the camera housing.

Below the wall 25, FIGURE 4, is a lower camera chamber 30 immediately behind the "taking" lens 22 which functions in the usual manner and whose structure is not effected by the present invention. In general, the twin lens reflex camera contains all of the standard controls and features common to the type of camera under consideration and these well-known elements and features form no part of the present invention and need not be dealt with in detail herein. In this category are such things as the means for focusing the twin lenses of the camera in unison, the means for rolling the film from one spool to another, the camera shutter operating means, and the speed and shutter opening adjustments. All of these features remain unchanged.

Mounted within the upper wall 24 of chamber 23 is the conventional ground glass element or screen 31 upon which the actual scene through the viewing lens 21 may be focused, composed and observed by the user. At this time, the foldable hood 32 on the top of the camera body 20 is in the erected or open position and the user looks directly down through this hood onto the screen 31. The upper chamber 23 of the camera contains a modified main mirror 33 fixedly secured therein to reflect the scene or image from the lens 21 onto the screen 31, and this arrangement is substantially conventional. The focusing head of the camera which supports both lenses 21 and 22 is indicated in FIGURE 4 at 34 and this head is movable outwardly and inwardly relative to the camera body 20 by conventional means.

The photometer proper has a barrel structure 35 which extends exteriorly of the camera body and is mounted rigidly upon one side wall thereof by means of a suitable flange 36. This barrel structure carries several components whose construction and operation will be described. The axis of the barrel structure 35 extends horizontally across the camera body and intersects the upper chamber 23, as shown in the drawings. The optical components of the photometer shown principally in FIGURES 4 and 8 are arranged wholly and bodily within the chamber 23 and rearwardly of and beneath the main mirror 33 which is disposed at 45 degrees to the axis of the lens 21 and 45 degrees to the screen 31. Consequently, the optical components of the photometer are rather compactly arranged as shown in FIGURE 4 in a subchamber 37 defined by the mirror 33, wall 27, wall 25 and a vertical partition 38 rigid with wall 25.

Figure 1:
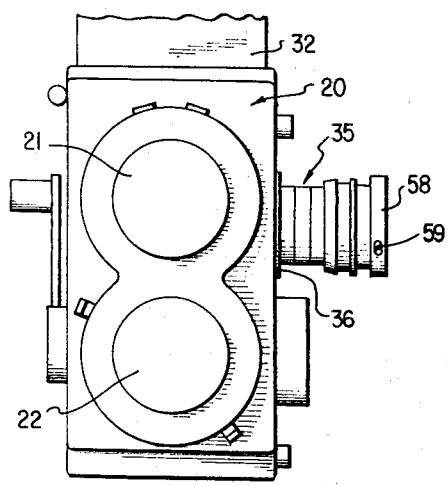
FIGURE 1 is a simplified front elevational view of a twin lens reflex camera having the built-in photometer in accordance with the invention, partly broken away.
Figure 2:
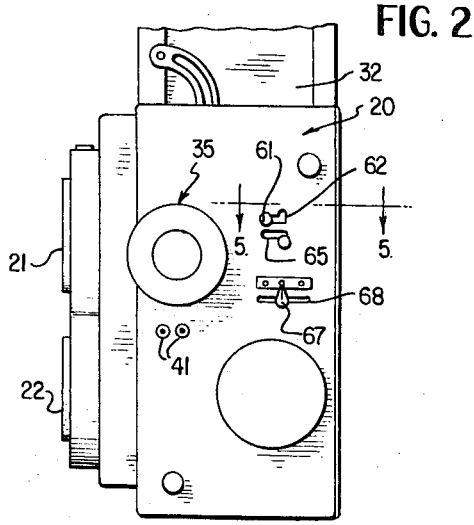
FIGURE 2 is a side elevation of the same.

The photometer system comprises a battery-energized bulb 39 of the fixed intensity type, socketed in the partition 38. Immediately forwardly of and surrounding the bulb 39 is a cylindrical photo-electric cell 40, energized by the bulb 39. This cell is utilized to supply current to an external galvanometer whose purpose will be further described, and terminals 41, FIGURE 2, are provided on the side of the camera body beneath the barrel structure 35 for plugging in the galvanometer.

Forwardly of the photo-electric cell 40 is a small fixed 45 degree mirror 42, above which is arranged a vertical axis diffusing screen 43 formed of double frosted glass. In vertical axial alignment with the components 42 and 43 is a pair of spaced collimating lenses 44 whose purpose is to permanently bring the image from diffusing screen 43 into sharp focus on the cube mirror to be described.

An important element of the photometer resides in an adaptation of a Lummer-Brodhun cube 45, FIGURE 9, consisting of a small circular spot mirror deposited by a known process on the diagonal face of a right-angled clear glass prism 46. A suitable correcting lens 47 is cemented to the rear face of the prism 46 to insure that light reflected from the spot mirror is afterwards permanently sharp on the ground glass screen 31. Another small fixed 45 degree mirror 48 is arranged adjacent the correcting lens 47 to reflect upwardly through an opening 49 in the main mirror 33 for directing the comparison spot of the photometer onto the same ground glass screen 31, along with the image or scene. The main mirror 33 of the conventional camera is modified by having the opening 49 and by having the cube 45 fixedly secured thereto. To avoid undesirable flare effects from the spot mirror on the prism 46, the lateral sides thereof, as well as the perimeter of the lens 47, have applied thereto a black non-reflecting coating. The other surfaces of these optical components remain clear to permit the passage of light in the system, as shown by the line 50 in FIGURE 9 and also by the broken line optical path in FIGURE 4.

The photometer system further comprises means to regulate the brightness of the comparison spot as viewed on the screen 31. Such means comprises a pair of shiftable optical wedges 51, FIGURE 8, whose opposed diagonal faces may be moved between positions where the wedges transmit minimum light through them (when their thickest parts are superposed) to positions where they transmit maximum light.

The wedges 51, FIGURES 4 and 8, are arranged between the collimating lenses 44 and are carried bodily by rack bars 52 whose teeth mesh with a spur gear 53 carried by a shaft 54, upon which is also mounted a small bevel gear 55. The bevel gear 55, in turn, meshes with a larger bevel gear 56 secured to a rotary sleeve 57 having screw-threaded coupling engagement with a rotatable ring 58 on the barrel structure 35. The sleeve 57 and ring 58 rotate in unison, as will be further described. It should now be clear that the opposed wedges 51 will shift selectively in the direction of the arrows, FIGURE 8, upon rotating of the sleeve 57 carrying the gear 56. Thus, when linear movement is imparted to the wedges 51, the projected spot on the ground glass screen 31 progressively is dimmed or brightened until it is caused to exactly match the shade of some portion of the object or scene being viewed.

Figure 5:
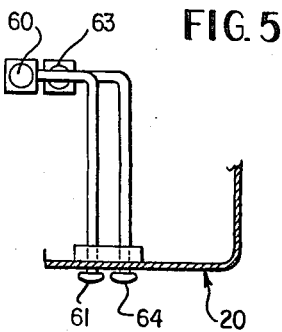
FIGURE 5 is a fragmentary plan view, partly in section, taken approximately on line 5—5 of FIGURE 2 and showing correction discs or filters for outdoor lighting and for indoor artificial lighting.

The spot photometer has additional refinements as follows. For average outdoor lighting, a white disc 60, FIGURE 5, may be shifted into axial alignment between upper lens 44 and cube 45 by a control knob 61 operating in a slot 62 on the side wall of the camera body, FIGURE 2. Similarly, a yellow disc 63 for indoor or artificial light is provided, having an operating knob 64 projecting through a slot 65. Either of these discs, depending upon requirements, may be shifted into or out of alignment with the optical axis of the spot photometer as depicted in FIGURE 4.

In somewhat similar manner, if the scene being viewed is of medium brightness, the middle brightness range disc 66, FIGURE 4, of a series of discs is shifted into alignment with the optical axis of the photometer by means of a pointer 67 slidable within a slot 68 on the side wall of the camera body 20, as shown in FIGURE 2.

These principal features above-described in the optical system of the spot photometer which is built into the camera and other like features are per se well-known and consitute a part and parcel of the SEI Exposure Photometer manufactured by Salford Electrical Instruments Ltd. and distributed by Ilford Limited, Ilford, Essex, England. This instrument is in wide use by photographers and illumination engineers and is fully described as to construction and operation in a publication printed in England in 1959 entitled "SEI Exposure Photometer" by Salford Electrical Instruments Ltd.

The main optical components and the energy system of the SEI photometer have been incorporated bodily into the twin lens reflex camera to produce the combination instrument of the present invention. However, as previously pointed out, the telescoped eyepiece of the photometer has been dispensed with and the bulk of the photometer has been considerably reduced by combining the optical components with the ground glass screen 31 and the camera optics, particularly as shown in FIGURE 4.

With continued reference to the SEI photometer structure, to prepare the invention for photographing a given scene with the camera, in which it is desired to expose for the darkest area in which detail is required, the well-known black dot on ring 69, which has aperture numbers on its circumference fixed in relation to the black dot, is rotated until it becomes aligned with a desired A.S.A. number on the underlying ring 70. The particular A.S.A. number, say 160, is an index of a film emulsion sensitivity to light. Again, this is all well-known in the use of the SEI photometer as a separate instrument. The discs 60 or 63 are now adjusted according to requirements for outdoor or indoor lighting, as previously described, and the brightness range discs or inserts 66, etc. are likewise adjusted to bring a clear, light gray or dark gray disc onto the optical axis in accordance with requirements.

The light originating from the bulb 39 passes through the photometer optical components to the screen 31, as indicated in FIGURE 4 and as previously described. The comparison spot projected through the opening 49 onto the screen 31 is initially black, and when the button 59 on the ring 58 is depressed to illuminate the bulb 39, the spot will be either too light or too dark relative to the surrounding image of the scene on the screen 31. While maintaining the button 59 depressed, the ring 58 is rotated and this adjusts the optical wedges 51 in the manner previously described until the comparison spot has the same light intensity as the adjacent area on the screen 31.

When this condition is achieved, a choice of lens aperture versus shutter speed is then read on the barrel 71, FIGURE 6, and suitable scales for this purpose are visibly marked on the barrel which is fixed to the side wall of the camera, as previously noted. The above presetting technique is essentially the same as followed with the existing SEI photometer, used as a separate instrument.

Graduations and range of each circumferential number scale on the barrel 71 are related to movements of the optical wedges 51. 120 degrees of rotation of the ring 58 and sleeve 57 moves the wedges 51 from the position at which they transmit minimum light to the position at which they transmit maximum light and vice-versa. As previously mentioned, rotation of ring 58 causes sleeve 57 and bevel gear 56 to rotate. Gear 56 drives gear 55 and gear 53 to impart linear motion to upper and lower rack bars 52. Each optical wedge 51 being fastened to a corresponding rack bar thus has linear motion imparted to it, whereby the projected spot on the ground glass screen 31 is progressively dimmed or brightened, depending upon the direction of rotation of ring 58 and associated elements.

Sleeve 57 contains preferably a small mercury-type battery 72 whose forward terminal is electrically connected to the bulb 39 through a suitable wire or spring 73, FIGURE 4. Rearwardly of the battery 72 and electrically connected therewith is a rheostat 74 which operates in known manner, as in the SEI photometer.

The photo-electric cell 40, energized by bulb 39, is used to supply current to the external galvanometer which may be connected at 41 to the system. When the button 59 is depressed, the galvanometer needle will swing to a fixed mark on its dial to indicate that the battery and bulb are operational. If either battery or bulb have weakened slightly, a crossbar on the central portion of ring 58, not shown, can be rotated to adjust the mentioned rheostat 74 for bringing the galvanometer needle to the proper point. This method of operation is conventional and well-known in connection with the SEI photometer and therefore no further description should be required herein.

While the galvanometer has been referred to as an external accessory plugged in at 41, it should be recognized that this component might also be permanently attached to the camera body within the scope of the invention.

The collimating lenses 44 serve the purpose of permanently bringing the image of diffusing screen 43 into sharp focus on the spot mirror of cube 45; critical focusing would reveal the grain of the "frosting" on the flat surfaces of diffusing screen 43 when looking at the projected spot on the ground glass 31. This technique is known and followed in connection with the standard SEI photometer.

Figure 3:
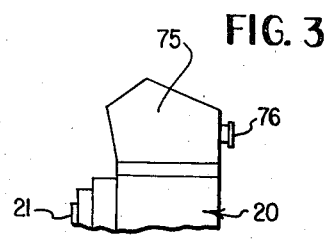
FIGURE 3 is a fragmentary side elevation, on a reduced scale, of a camera in accordance with a slight modification of the invention.

Since it is desirable that colors of the scene and also the projected spot hue seen on the ground glass 31 are not subjected to stray light entering the hood 32, a preservation of color saturation and avoidance of flare can be realized by substituting an enclosed glass pentaprism 75 having a rear eyepiece 76, FIGURE 3, for the usual hood arrangement. An additional advantage of this modification is that the scene will not be reversed from left-to-right as a mirror image, as is the case when looking directly through the hood 32 at the ground glass screen 31. However, in all cases with the invention, the viewed image or scene will be upright and will show exact image which will appear on the finished photograph, and herein resides a distinct advantage of the invention over the use of the SEI photometer as a separate instrument.

A white dot on ring 69 is located 180 degrees from the black dot on this ring, and is used for correct exposure setting for a light colored object in a scene and for color reversal work. This feature is conventional with the SEI photometer. Other features and capabilities of the SEI photometer remain unchanged by combining this instrument with the camera in accordance with the present invention. The utility of both instruments, in effect, is enhanced and the overall convenience and efficiency of the combined instrument offers a significant improvement to the photographer. It is thought that the advantages of the invention will now be apparent to those skilled in the art without the necessity for any further description herein.

FIGURE 10 illustrates diagrammatically how the comparison spot S would appear on the ground glass screen 31 superimposed directly upon the scene or image I. By the operation of the invention as already described the hue or shade of the comparison spot may be matched with the image.

It is to be understood that the forms of the invention herewith shown and described are to be taken as preferred examples of the same, and that various changes in the shape, size and arrangement of parts may be restored to, without departing from the spirit of the invention or scope of the subjoined claims.

Having thus described my invention, I claim:

1. A combined camera and exposure meter comprising a twin lens reflex camera body having upper and lower separated chambers and a film spool chamber at the rear of the upper and lower chambers and a ground glass viewing screen at the top of the upper chamber, a barrel secured to one side wall of the camera body adjacent the upper chamber and with its axis intersecting the upper chamber, a rotary control ring on said barrel including a sleeve part inside of the barrel, a first gear on the sleeve part projecting into said upper chamber, additional gearing within the upper chamber meshing with and driven by said first gear, a pair of optical wedges connected with said additional gearing and adapted to be shifted relatively thereby, and a source of light in the upper chamber for directing light through the optical wedges to said viewing screen, whereby the user can simultaneously view the image to be photographed and match a comparison spot of light with the hue of a portion of the image.

2. The invention as defined by claim 1, and a pair of collimating lenses mounted in the upper chamber on opposite sides of the optical wedges, and brightness range selector means on the camera body and projecting into the path of light through said wedges and lenses and being operable from the exterior of the camera body.

3. A combined camera and photometer comprising a camera body having a viewing chamber and a photographing chamber, viewing and photographing lenses on the camera body adjacent said chambers, a relatively large viewing screen on the camera body at one side of the viewing chamber on which an object image may be focused while a small spot of light projected onto the screen is matched in hue with a small portion of said image, a diagonal mirror within the viewing chamber reflecting the object image from the viewing lens onto said screen, said mirror having a small through opening, a small spot reflector means on the bottom of the diagonal mirror near the through opening to direct a small spot beam of variable intensity light through said opening and onto the viewing screen, and manually adjustable spot intensity regulating means in the viewing chamber in optical alignment with the small spot reflector means and including a source of light.

4. A combined camera and photometer according to claim 6, and wherein said adjustable spot intensity regulating means includes a pair of opposed relatively movable optical wedges disposed between the source of light and small spot reflector means.

5. A combined camera and photometer according to claim 4, and wherein the small spot reflector means comprises a small prism attached to the bottom of said diagonal mirror and having a small spot reflecting surface thereon and a coacting diagonal reflector aligned with the small spot reflecting surface and said through opening of the diagonal mirror.

References Cited

UNITED STATES PATENTS

| | | | |
|---|---|---|---|
| 1,213,485 | 1/1917 | Herz | 95—10 |
| 1,447,906 | 3/1923 | Snyder et al. | 95—10 |
| 1,614,672 | 1/1927 | Herz | 95—10 |

OTHER REFERENCES

"SEI Exposure Photometer" by Salford Electrical Instruments Inc.

NORTON ANSHER, *Primary Examiner.*

R. A. SCHROEDER, *Assistant Examiner.*